ARRANGEMENT FOR THE OVERFLOW STORAGE WITH RESPECT TO BUSY LINES IN TELECOMMUNICATION THROUGH SWITCHING (CIRCUIT-SWITCHING) SYSTEMS

Filed July 14, 1966

United States Patent Office 3,529,076

Patented Sept. 15, 1970

3,529,076

ARRANGEMENT FOR THE OVERFLOW STORAGE WITH RESPECT TO BUSY LINES IN TELECOMMUNICATION THROUGH SWITCHING (CIRCUIT-SWITCHING) SYSTEMS

Kurt Sobotta, Ditzingen, Germany, assignor to International Standard Electric Corporation, New York, N.Y., a corporation of Delaware Filed July 14, 1966, Ser. No. 565,186
Int. Cl. H04n 15/00, 3/64
U.S. Cl. 178—2 3 Claims

ABSTRACT OF THE DISCLOSURE

Storage system which enables subscriber at calling line to exercise option of cancelling a call reaching a busy junction or of storing digital and speech messages for later transmittal. Storage means are provided for storing numbers being called and a message if called extension is busy. When called extension becomes idle, connection between storage device and extension is made and message is delivered automatically.

Figures 1, 2:
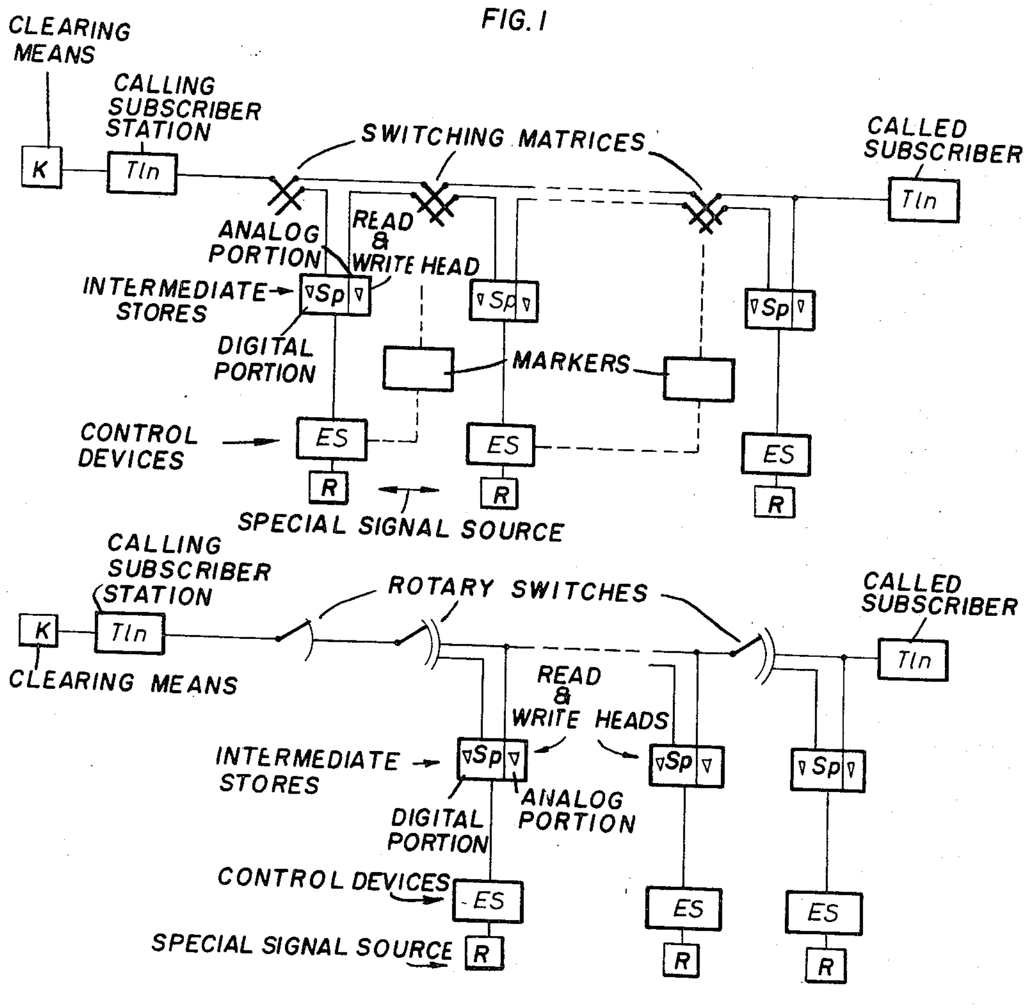

This invention relates to overflow storage systems and more particularly, to such storage arrangements used to store control signals and message signals.

In telecommunication systems, such as telex systems, and telephone systems, it is frequently required, when possible connecting paths extending to the called subscriber are busy, that further attempts for establishing the connection be stopped. Instead means are provided to accomplish the automatic establishment of the desired connection immediately after the lines have become free. Especially in telex through-switching systems it is possible in this way to reduce the time losses and to increase the economy of a system. The losses are further reduced if the control signals and message are stored for use after the connecting paths become idle so that the calling subscriber can release. Likewise, in telephone networks it may be of importance to transmit a short, urgent message to a busy subscriber at the earliest possible time before he becomes unobtainable.

The present invention relates to arrangements for the message storage in the case of busy lines. The message is stored for the time duration of the busy condition of the connection or of partial sections of the connection between the calling and the called subscriber, in one or several successive stores. As soon as the connecting paths or the called station go idle the connection between the stored message and the called station is completed in accordance with the stored dial information. Arrangements of this kind are mentioned e.g. in the book by E. Rossberg and H. Korta "Fernschreib-Vermittlungstechnik" (Teleprinter Switching Technique) as published by Van Nostrand 1959, page 70, i.e. with reference to telegraph station offices in the Netherlands. In cases where the line is found busy, the calling subscriber is automatically connected to a receiving perforator (reperforator) at the associated automatic teleprinter exchange, causing the message to be stored on a perforated tape.

The arrangement of the present invention is distinguishable over the abovementioned arrangement in that it is based on the capability of enabling the calling subscriber himself to make a decision as to whether he wishes to repeat the call and, consequently, the transmission of his message, at a later time or whether he wishes to utilize intermediate storage in accordance with the invention. The capability of enabling the calling party to make such a decision may be of importance, in cases where for reasons of secrecy, the intermediate storage of the message and, consequently, its evaluation by unauthorised persons, which would be possible on principle, is undesirable. Another example of where the capability of enabling the calling party to make such decisions is in the military or space-flight sector where the transmission at a somewhat later time position is objectionless, or would require a modification of the message. The making of such an optional decision is impossible when using the aforementioned Dutch system, because in that system the connection to the receiving perforator is effected automatically.

Accordingly, the main feature of the present invention resides in the fact that upon selecting the connection, a special service signal is transmitted to the calling subscriber instead of a busy signal. By this special service signal the calling subscriber is requested to transmit optionally either the remaining dial information and the message for being intermediately stored, or to disconnect the call. In the first case, and subsequently to the setting free of the previously occupied connection, the message is either transmitted directly to the called subscriber or, if necessary to one or, successively, to several further intermediate storages positioned at the respective connecting point between the section which has just become free, and the following section which is still busy.

In further embodiments of the invention, the calling subscriber either operates a special "YES" key or transmits predetermined signals. Then the dial information, is transmitted from the subscriber register designed as a full-type store into the first intermediate store, whereupon the subscriber register requests the calling subscriber, to transmit the message.

In the arrangement according to the present invention tape shaped record media (perforated tapes or magnetic tape stores) are particularly suitable for being used as the intermediate stores. Each intermediate store has assigned thereto a corresponding device, such as a register and/or a corresponding transmitting aggregate. This device supervises in the manner know per se, the exchange of the answer-back signals.

When using the invention in telephone systems, the intermediate stores consist of an analogue portion intended for speech storing purposes, and of a digital portion intended for receiving the dial information. As analogue stores there may be used magnetic tape units. In this connection it is appropriate to accommodate both the analogue and the digital partial store spacially on one and the same recording medium, in other words: to use the same magnetic tape unit for recording the dial information as well as the speech. Relative thereto, and in accordance with a further embodiment of the invention there may be used either for each of the two categories of information separate magnetic recording, writing and reproducing (reading) heads, cooperating with parallel tracks of the magnetic tape. Alternatively, the same record and reproduce heads combined with switch-over means can be used for the analogue as well as for the digital writing and reading purpose, so that both kinds of information can be successively recorded on the magnetic tape or read (reproduced) therefrom.

It is to be noted that the system as proposed by the present invention, namely that of providing an intermediate storing, as many features which are related to systems employing a fully automatic storage allocation (section storage system) of the types known per se. This system, for example, is described in detail in the aforementioned book by Rossberg and Korta on pages 215 to 276. The intermediate storage system according to the present invention represents a combination of the conventional systems employing a through-going connection (through-switching systems) with the aforementioned section storage systems, but with emphasis on the through-switching system.

Also with respect to the section storage system it is known to seize an intermediate storage set if the line is found busy (see the aforementioned book, pages 262 to 263). However, also in this case, in the prior art systems, no provisions are made for enabling the calling subscriber to decide on whether to use the intermediate storing. In fact, in the prior art if the switching link serving the establishment of a connection, is incapable of finding a free or idle line, the message is automatically fed from the receiving storage set into an intermediate storage set. Thus, in the prior art systems the calling subscriber has made an irrevocable decision as soon as he has delivered the telegram or transmitted the message to the point of origin of a section storage system.

The above-mentioned and other objects and features of the invention and the manner of attaining them will become more apparent and the invention itself will be best understood by reference to the following description of an embodiment taken in conjunction with the accompanying drawings, wherein:

FIG. 1 shows by block diagram form a telecomunication, e.g. teleprinter (telex) intermediate storing system according to the present invention, which is provided e.g. in its upper part with switching grids at the through-dialling points; and FIG. 2 shows a similar system using the usual rotary selectors.

The intermediate (overflow) stores are indicated by the references S*p*, and the switching links (control devices) are indicated by ES. The control devices include the "complete stores" if the first switching or connecting link and the marker (Mark) in FIG. 1 has not found a free connection then, the calling subscriber at station receives (T1*n*), a special service signal from the equipment R associated with control equipment ES, whereby he is asked whether he wishes to transmit his message in spite of the busy condition. A taped message such as used in toll call system can be used for this purpose and transmit an audible message, such as "storing?." If he wishes to do without the storing, he only has to depress the clearing key in a telex system or hang up in telephone system. The clearing key or hook switch is indicated by the block K associated with the calling subscriber station. If he wishes his message to be stored, he transmits the aforementioned information, for example, by pressing a special key in a telex system or simply by not releasing the connection in a telephone system. The intermediate store is then attached to receive the dial information and the actual message. After the connection becomes free in the first switching grid, the further connection is automatically established quite in the sense of the section storage (sectional storing) technique, i.e. either until reaching a further occupied section, in which case there is then compulsorily effected a new overflow storing or else, if everything is found free, to the called subscriber (T1*n*).

Of course, when using the invention in telephone systems, provisions must still be made at the receiving end for the automatic tripping of the calling signal, in order that the called subscriber may prepare himself for receiving the message as transmitted by the magnetic tape, which is not necessary in the case of teleprinter (telex) systems.

While I have described and illustrated a preferred embodiment of my invention in connection with specific apparatus, it is to be clearly understood that this description is made only by way of example and not as a limitation on the scope of my invention.

What is claimed is:

1. An overflow storage arrangement for effecting message storing in the case of busy lines in telecommunication through switching systems, said systems comprising a plurality of subscriber stations, a plurality of serially connected switches for selectively interconnecting calling and called ones of said plurality of subscriber stations in accordance with dial information generated at the calling one of said plurality of subscriber stations, control devices located between said serially connected switches for controlling the operation of said switches to establish a path from the calling one to the called one of said plurality of subscriber stations, said control devices including marker means operating under the control of said dial information for establishing the path through each of said switches according to a portion of the dialed information, said control devices comprising intermediate store means, means at each of said control devices operated responsive to a busy condition in the succeeding portion of the path being established for transmitting a special signal to the calling subscriber instead of a busy signal, means at the calling one of said plurality of said subscriber stations operated after receipt of said special service signal for causing the dial information necessary to complete the path between the calling and called ones of said subscriber stations and a message to be stored in said intermediate store means located prior to the busy portion of said path to enable the calling subscriber station to be returned to an on-hook condition, and means operated responsive to said busy portions of the path becoming idle for automatically retransmitting the stored dial information to establish the path to said called subscriber station and said intermediate store means for transmitting said stored message to said called subscriber.

2. The arrangement according to claim 1 characterized in that the calling subscriber at the calling one of said plurality of stations initiates the desired intermediate storing by transmitting a predetermined signal responsive to the receipt of said special service signal.

3. The arrangement according to claim 2 wherein said intermediate store means are equipped to transmit the stored dial information through available portions of the path to the intermediate store means subsequent to a still busy portion of the path.

References Cited

UNITED STATES PATENTS

| | | |
|---|---|---|
| 2,932,688 | 4/1960 | Wright et al. |
| 2,952,731 | 9/1960 | Wright et al. |

DONALD J. YUSKU, Primary Examiner

M. M. CURTIS, Assistant Examiner

U.S. Cl. X.R.

178—3, 4.1